J. G. TRUMBLY.
AUTOMOBILE TOP.
APPLICATION FILED DEC. 17, 1917.
1,308,209.
Patented July 1, 1919.
2 SHEETS—SHEET 2.
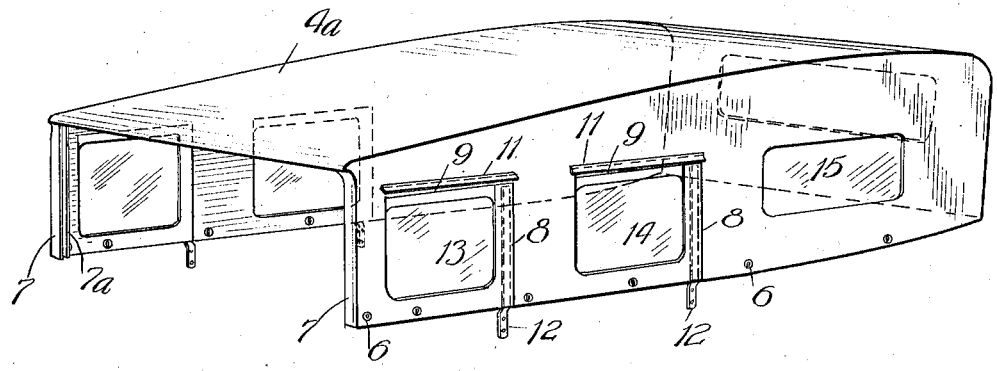
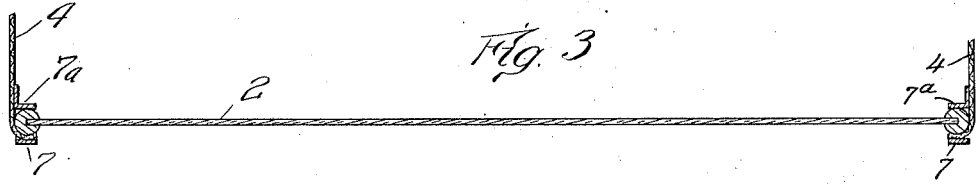
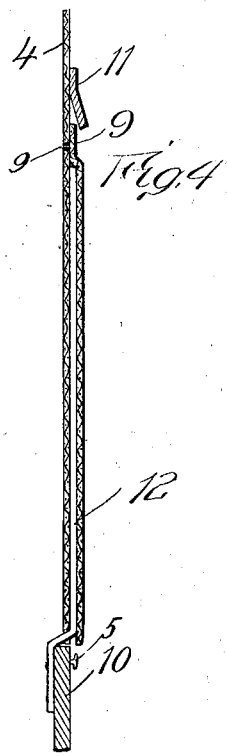
Inventor:
JAMES G. TRUMBLY.
by O D Martin
his Atty.

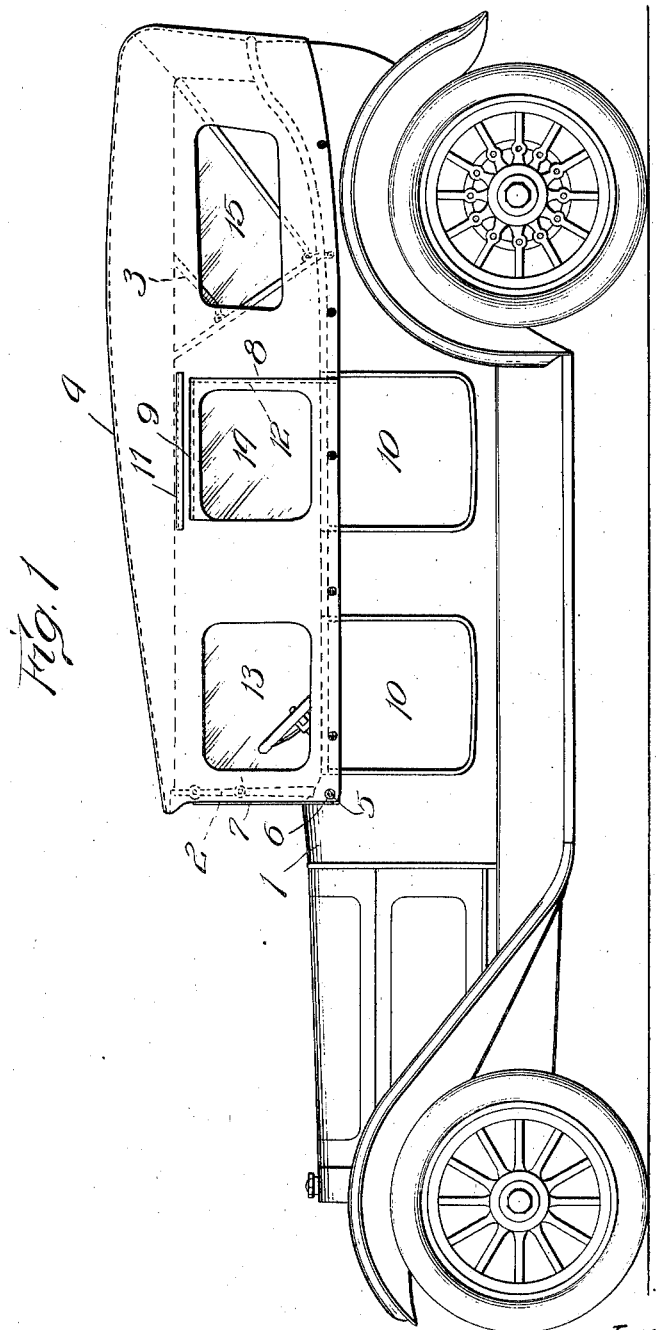

UNITED STATES PATENT OFFICE.

JAMES G. TRUMBLY, OF CHICAGO, ILLINOIS.

AUTOMOBILE-TOP.

1,308,209.         Specification of Letters Patent.         Patented July 1, 1919.

Application filed December 17, 1917. Serial No. 207,411.

*To all whom it may concern:*

Be it known that I, JAMES G. TRUMBLY, a citizen of the United States, residing at Chicago, in the county of Cook and State of Illinois, have invented new and useful Improvements in Automobile-Tops, of which the following is a specification.

This invention has relation to a vehicle and refers more particularly to means for covering open vehicles.

With the advent of motor vehicles the art of making vehicle tops has greatly improved, and the aim is to provide tops (one man tops, so called) which may quickly be positioned for use, and which may be folded out of the way when not in use.

Such tops are, however, open at the sides and offer little protection against cold or inclement weather. It is common practice at the present time to build combination wooden, metal and glass panels into these side openings, but such panels are of a semi-permanent character in that they cannot readily be detached and stored away within the vehicle. With these panels in place the tops also become permanent fixtures, called upon to stand more severe service than intended.

With these conditions in view my invention consists in providing a one piece sur-top or top cover, which may readily be placed or removed by the occupant of the vehicle, and which, when removed, can be folded into a small bundle and stored away, out of sight, within the vehicle.

The objects and advantageous features of my invention will become clear to anyone upon perusal of the following description, particularly when it is read in combination with the appended drawings of which:

Figure 1 is a side elevation of a motor vehicle embodying my invention.

Fig. 2 shows, in perspective, the device lifted off the vehicle, Fig. 3 shows the wind shield in detail, and Fig. 4 is a cross sectional view of one of the doors of the vehicle with the device attached.

The numeral 1 denotes the body of a motor vehicle on which is affixed a windshield 2 in the usual manner, and a demountable top 3 is shown in place as common in practice.

The surtop 4, comprising my invention, is made of suitable fabric, waterproofed and otherwise treated to resist the attacks of the elements. It presents one continuous piece, so shaped as to fit snugly over the top 3 and along the windshield 2, over both of which the occupant first draws the surtop, whereupon he fastens the lower edges of the surtop on the sides of the vehicle. For this purpose a series of buttons 5 of any approved construction, are provided on the vehicle for engagement with a corresponding series of eyelets 6 along the edges of the surtop.

It is readily seen that this surtop fits tightly over the vehicle top 3, and it may conveniently, along the sides of the windshield, be reinforced by sewing suitable strips, 7, 7ª, along its edges so as to form channels encompassing the edges of the windshield.

Doors are provided by cutting slits 8, 9, in the sides of the surtop in continued alinement with the doors 10 of the vehicle, and the edges of these slits are suitably reinforced by adding substantial strips, which latter also overlap so as to form tight joints. The reinforcement above the horizontal slit 9 may conveniently take the form of a rainshield 11.

In order to make the surtop doors follow the movement of the vehicle doors a suitable metal post 12 is sewed into the overlapping edge of the surtop door adjacent to the vertical slit 8, and this post is clamped or otherwise secured to the vehicle door. As the said post is somewhat flexible it holds the surtop door tightly pressed against the edge of the surtop-body. There may be both front and rear doors, as indicated in Fig. 2, or one or both of the front doors may be omitted as shown in Fig. 1, in which last case the occupant will have to unfasten the lower front corner of the surtop in order to enter or leave the front seat of the vehicle.

Suitable windows 13, 14, 15, of celluloid or other suitable transparent material are, of course, also provided.

The advantages of my one-piece demountable surtop are readily seen. When not in use it is rolled up into a small package, easily stored. It is inexpensive and one man can quickly place it in position. It covers the vehicle completely, and it protects the vehicle top against the elements. Finally, a surtop of this type can readily be formed to fit any size or shape of vehicle top at a small expense.

I claim:

1. In combination with a vehicle having doors and an affixed top, a surtop shaped to fit snugly over the said top and depending upon the said top for its support, the said surtop having doors in continued alinement with the vehicle doors, means attachable to the vehicle doors for operating the surtop doors, and means for attaching the surtop to the sides of the vehicle.

2. In a vehicle, in combination with the vehicle body, doors and top, a surtop drawn tightly over the vehicle top by which it is supported and buttoned on to the body, said surtop comprising a continuous piece of flexible material having doors formed by cutting perpendicular slits in the material in continued alinement with the vehicle doors, reinforcements affixed so as to form overlapping door joints, and metal strips vertically fixed within the said reinforcements and attachable to the vehicle doors.

3. In combination with a vehicle body, doors and top, a detachable vehicle cover made in a continuous piece of flexible material and shaped to fit snugly over the supporting vehicle top, reinforced channel-shaped front edges for engagement with the sides of the vehicle wind shield, means for buttoning the lower edges of the cover on to the vehicle body, doors cut into the cover material, and means for attaching the outer edges of the said doors to the vehicle doors for simultaneous operation.

In testimony whereof I have hereunto affixed my signature.

JAMES G. TRUMBLY.